United States Patent
Ku et al.

(10) Patent No.: US 7,321,683 B2
(45) Date of Patent: Jan. 22, 2008

(54) METHOD FOR INDEPENDENTLY ADJUSTING SIX COLOR CLASSES WITH THE CONSIDERATION OF BOUNDARY COLORS ON A DISPLAY DEVICE

(75) Inventors: Chao-Chee Ku, Hsin-Chu (TW); C-J Chen, Hsin-Chu (TW); Joe Yang, Hsin-Chu (TW)

(73) Assignee: Weltrend Semiconductor, Inc., Hsinchu (TW)

( * ) Notice: Subject to any disclaimer, the term of this patent is extended or adjusted under 35 U.S.C. 154(b) by 835 days.

(21) Appl. No.: 10/757,010

(22) Filed: Jan. 14, 2004

(65) Prior Publication Data

US 2004/0140979 A1 Jul. 22, 2004

(30) Foreign Application Priority Data

Jan. 22, 2003 (TW) .............................. 92101415 A

(51) Int. Cl.
*G06K 9/00* (2006.01)

(52) U.S. Cl. ...................... 382/162; 382/167; 382/274; 345/589; 358/1.9

(58) Field of Classification Search ................ 382/162, 382/164, 165, 166, 167, 274; 358/1.9, 518–523; 345/589–604; 348/453–454
See application file for complete search history.

(56) References Cited

U.S. PATENT DOCUMENTS 5,644,336 A * 7/1997 Herbert ...................... 345/603
6,243,059 B1 * 6/2001 Greene et al. ................ 345/88
2001/0033399 A1 * 10/2001 Kashioka ..................... 358/518
2003/0222894 A1 * 12/2003 Toji et al. .................... 345/694
2006/0023939 A1 * 2/2006 Kashioka ..................... 382/162

* cited by examiner

*Primary Examiner*—Matthew C. Bella
*Assistant Examiner*—Ali Bayat
(74) *Attorney, Agent, or Firm*—Anthony R. Barkume, PC

(57) ABSTRACT

A method for independently adjusting six color classes with the consideration of boundary colors on a display device comprises steps of: detecting a plurality of pixels of a display device and calculate a first tint and a second tint of the pixels; defining a first pixel, the first tint and second tint of the first pixel both locating in the targeted color class; defining a second pixel, the second pixel being close to the first pixel, and the first tint and the second tint of the second pixel both locating in the neighboring of the targeted color class; defining a third pixel, said third pixel being neither the first pixel nor the second pixel; finding the first pixel and second pixel and adjusting their colors; and finding the third pixel and keeping its original color.

9 Claims, 3 Drawing Sheets

METHOD FOR INDEPENDENTLY ADJUSTING SIX COLOR CLASSES WITH THE CONSIDERATION OF BOUNDARY COLORS ON A DISPLAY DEVICE

FIELD OF THE INVENTION

The present invention is related to a method for independently adjusting six color classes with the consideration of boundary colors on a display device, and more particularly to detect every pixel on a display device and adjust a specific targeted color class, and furthermore adjust pixels that adjoin the adjusted ones and belong to the boundary colors of the target class, so as to have the screen of the display device meeting users' requirements better.

BACKGROUND OF THE INVENTION

There are two coordinate systems used to present the colors displayed on a display device. One is RGB system (Generally, RGB is used to indicate three original colors without gamma correction R'G'B' for colors with gamma correction), and the other is Y, Cb, Cr system (or Y, U, V; or Y, Pb, Pr). However, we must use only the R'G'B' system to display colors on a display device such as TFT-LCD.

FIG. 1 is a diagram of RGB coordinate system. In RGB coordinate system, the color distribution is presented in a cube style. Whenever one of the axes is adjusted, the color of each pixel will be affected, so, controlling over a specific color independently is very difficult. Consequently, we generally transfer the RGB coordinate system into the Y (illumination), Cb (the first tint), Cr (the second tint) system (or Y, U, V; or Y, Pb, Pr).

FIG. 2 shows the Y, Cb, Cr coordinate system. After transferring RGB into Y,Cb,Cr, each color can be simply controlled by two parameters (Cb, Cr). So, most of the video image systems use Y, Cb, Cr (or Y, U, V; or Y, Pb, Pr) coordinate system to perform the color management.

Colors shown on a generic display device can be adjusted with different users' needs. Taking adjustment of blue as an example, some may prefer magenta-oriented blue, but others may prefer cyan-oriented blue. Yet, traditional color adjustment of a display device can't successfully adjust a specific color class independently. So, when some color class is adjusted through tuning, other color classes will also be adjusted simultaneously. It will cause the incongruity in pictures of a display device. For example, if, we adjust only the blue (B) element of every pixel (Each pixel is composed of RGB.), of course the blue part will be modified, but actually all the other color elements of the pixel will be affected. Even if we use Y, Cb, Cr coordinate system and adjust Cb or Cr only, the outcome will be the same. So, traditional hue adjustment of a display device has this drawback. Because colors can't be adjusted independently, the whole image color can't be tuned to a satisfactory condition.

The theory of adjusting a specific color class is first to determine Cb and Cr values of each pixel. If we've decide to adjust some pixel's color, in what range we should adjust (ex. +5% or −5%) is the next step for consideration. However, adjusting a specific color class will lead to the problem of boundary, if pixels of other neighboring colors are also inside the area for adjustment. As FIG. 3 shows, the image colors of an orange includes orange of red class (area A) and orange of yellow class (area B). If we only adjust the pixels in the red class, there will be an obviously non-continuous rim happened between area A and area B, which causes incongruity of the image colors. Therefore, how to avoid the problem of boundary when adjusting a specific color class is exactly the concern of this invention.

SUMMARY OF THE INVENTION

An objective of the present invention is to propose an innovation of independently adjusting six color class on a display device.

Another objective of the present invention is to detect every pixel's color and identify if it belongs to a specific color class (or another neighboring ones) and if pixels neighboring with it also will be adjusted.

Another objective of the present invention is to decide whether we should adjust a pixel's color.

Another objective of the present invention is to adjust each color class independently.

Another objective of the present invention is to solve the problem of boundary resulting from color adjustment.

Another objective of the present invention is to fit each individual's requirement greatly.

According to the present invention, a method for independently adjusting six color classes with the consideration of boundary colors on a display device comprises steps of:

detecting a plurality of pixels of a display device and calculating a first tint and a second tint of the pixels;

defining a first pixel, the first tint and second tint of the first pixel both locating in the targeted color class;

defining a second pixel, the second pixel being close to the first pixel, and the first tint and the second tint of the second pixel both locating in the neighboring of the targeted color class;

defining a third pixel, said third pixel being neither the first pixel nor the second pixel;

finding the first pixel and second pixel and adjusting their colors; and finding the third pixel and keeping its original color.

In accordance with one aspect of the present invention, the display device is a LCD or PDP or OLED.

In accordance with one aspect of the present invention, there are six independent color classes.

In accordance with one aspect of the present invention, the six independent color classes are red class, yellow class, green class, cyan class, blue class, and magenta class.

In accordance with one aspect of the present invention, the six independent color classes take the area around 42 degrees, as shown in FIG. 4, in the two dimensions of Cb, Cr, respectively, where the red class is between 81 to 124 degrees and centered at 103 degrees; the yellow class is between 146 to 188 degrees and centered at 167 degrees; the green class is between 220 to 262 degrees and centered at 241 degrees; the cyan class is between 262 to 304 degrees and centered at 283 degrees; the blue class is between 326 to 8 degrees and centered at 347 degrees; the magenta class is between 40 to 81 degrees and centered at 61 degrees.

In accordance with one aspect of the present invention, each of the six independent color classes can be subdivided into two sub color classes taking the area around 21 degrees in the two dimensions of Cb, Cr, respectively.

In accordance with one aspect of the present invention, the red class further has its own first sub-red class and second sub-red class; the yellow class further has its own first sub-yellow class and second sub-yellow class; the green class further has its own first sub-green class and second sub-green class; the cyan class further has its own first sub-cyan class and second sub-cyan class; the blue class further has its own first sub-blue class and second sub-blue class; the magenta class further has its own first sub-magenta class and second sub-magenta class. And, sub-yellow-red (YR) is defined as between the first sub-yellow (Y1) and the second sub-red (R2); sub-green-yellow (GY) is defined as between the first sub-green (G1) and the second sub-yellow (Y2); sub-blue-cyan (BC) is defined as between the first sub-blue (B1) and the second sub-cyan (C2); sub-magenta-blue (MB) is defined as between the first sub-magenta (M1) and the second sub-blue (B2).

In accordance with one aspect of the present invention, the neighboring colors of the red class are the sub-yellow-red (YR) class and the second sub-magenta (M2) class; the neighboring colors of the yellow class are the sub-green-yellow (GY) class and the sub-yellow-red (YR) class; the neighboring colors of the green class are the first sub-cyan (C1) class and the sub-green-yellow (GY) class; the neighboring colors of the cyan class are the sub-blue-cyan (BC) class and the second sub-green (G2) class; the neighboring colors of the blue class are the sub-magenta-blue (MB) class and the sub-blue-cyan (BC) class; the neighboring colors of the magenta class are first sub-red (R1) class and the sub-magenta-blue (MB) class.

The present invention may best be understood through the following description with reference to the accompanying drawings, in which:

DETAILED DESCRIPTION OF THE PREFERRED EMBODIMENT

Figure 1:
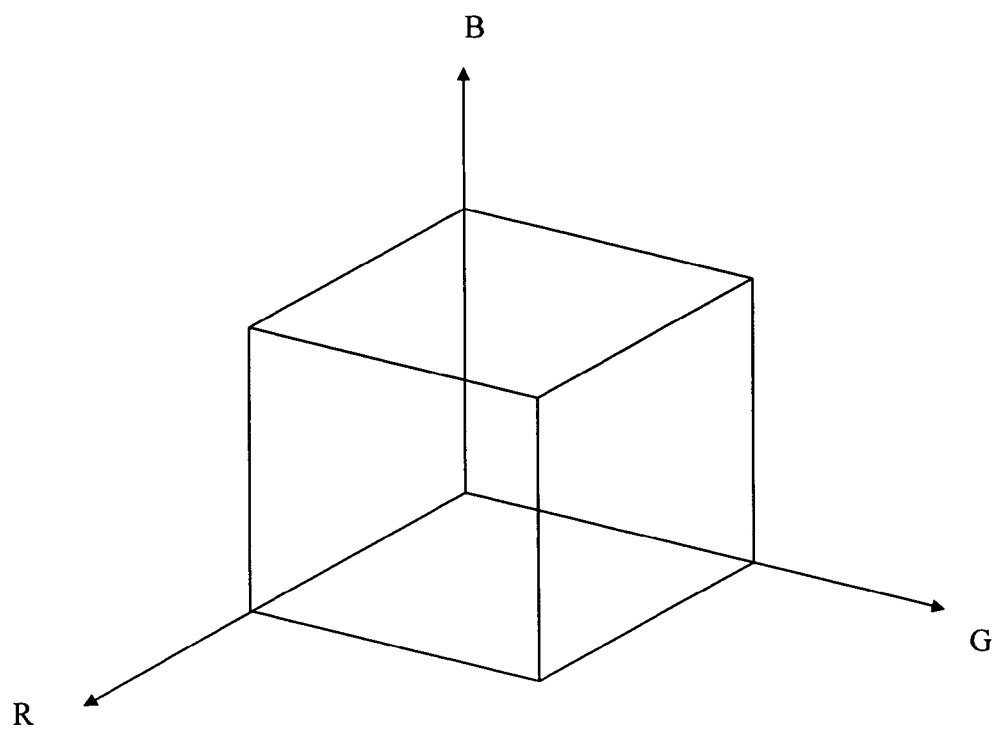
FIG. 1 shows the traditional RGB coordinate system.
Figure 2:
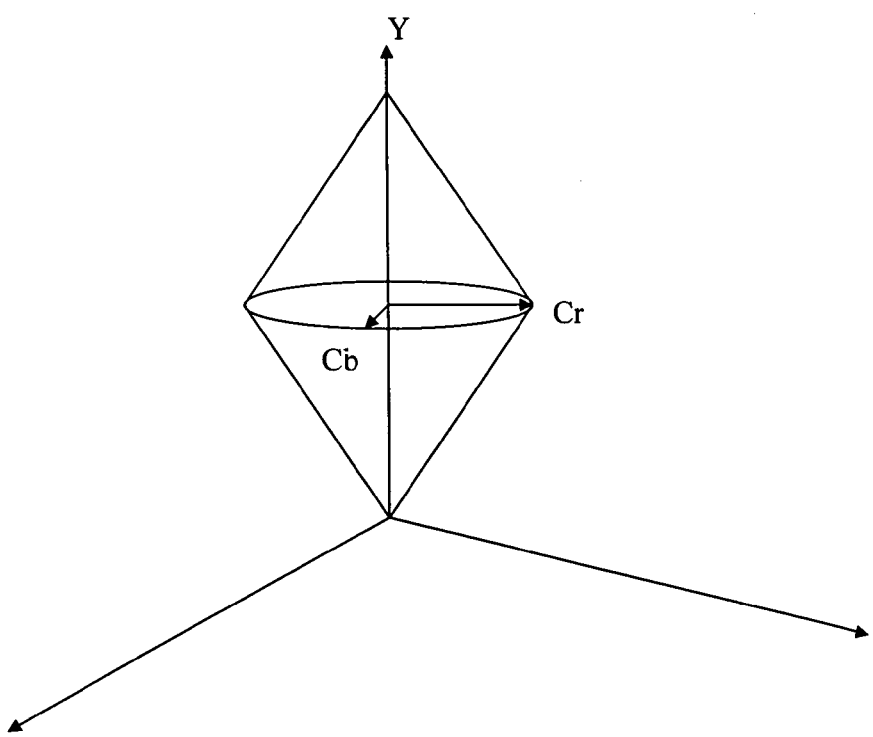
FIG. 2 shows the traditional Y (Cb) (Cr) coordinate system.
Figure 3:
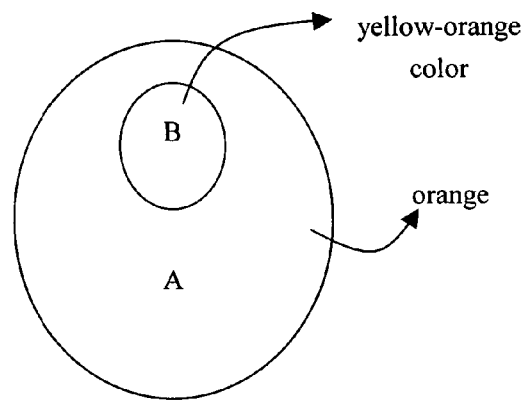
FIG. 3 shows the problem of boundary resulting from independently adjusting a specific color class.
Figure 4:
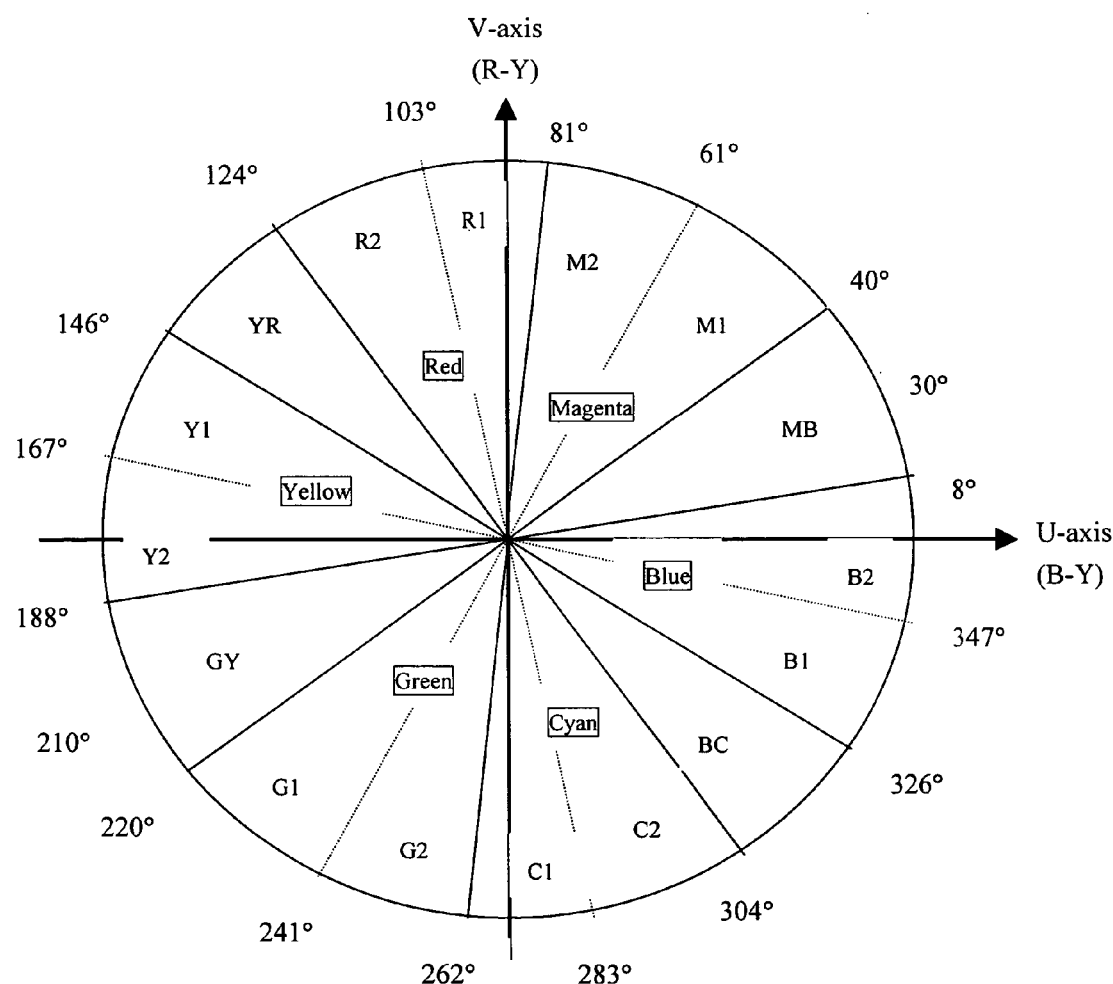
FIG. 4 shows six specific color classes and their neighboring colors according to the present invention.

Please refer to FIG. 4. By the Y (Cb) (Cr) coordinate system, we may decide a specific color class by two axes (Cb) (Cr), and each of specific color class can be subdivided into its own $1^{st}$ and $2^{nd}$ sub-color classes:

1. The red class is between 81 to 124 degrees, including the $1^{st}$ sub-red class R1 and the $2^{nd}$ sub-red class R2.
2. The yellow class is between 146 to 188 degrees, including the $1^{st}$ sub-yellow class Y1 and the $2^{nd}$ sub-yellow class Y2.
3. The green class is between 220 to 262 degrees, including the $1^{st}$ sub-green class G1 and the $2^{nd}$ sub-green class G2.
4. The cyan class is between 262 to 304 degrees, including the $1^{st}$ sub-cyan class C1 and the $2^{nd}$ sub-cyan class C2.
5. The blue class is between 326 to 8 degrees, including the $1^{st}$ sub-blue class B1 and the $2^{nd}$ sub-blue class B2.
6. The magenta class is between 40 to 81 degrees, including the $1^{st}$ sub-magenta class M1 and the $2^{nd}$ sub-magenta class M2. And,
7. The sub-yellow-red (YR) is between 124 to 146 degrees.
8. The sub-green-yellow (GY) is between 188 to 220 degrees.
9. The sub-blue-cyan (BC) is between 304 to 326 degrees.
10. The sub-magenta-blue (MB) is between 8 to 40 degrees.

Neighboring colors of each of the six specific color classes are defined as follows:

Neighboring colors of the red class are YR and M2; neighboring colors of the yellow class are YR and GY; neighboring colors of the green class are C1 and GY; neighboring colors of the cyan class are BC and G2; neighboring colors of the blue class are MB and BC; neighboring colors of the magenta class are R1 and MB.

The range of each of the six specific color classes can be calculated by the angle between Cb and Cr in the Y, Cb, Cr coordinate system, and axes of Y, Cb, Cr can be transferred from those of RGB by the following formulas:

$$Y'_{601}=0.299R'+0.587G'+0.114B'$$

$$Cb=-0.168736R'-0.331264G'+0.5B'$$

$$Cr=0.5R'-0.418688G'-0.081312B' \qquad (1)$$

In formula (1), R', G', B' represent R, G, B, respectively after gamma correction.

Figure 5:
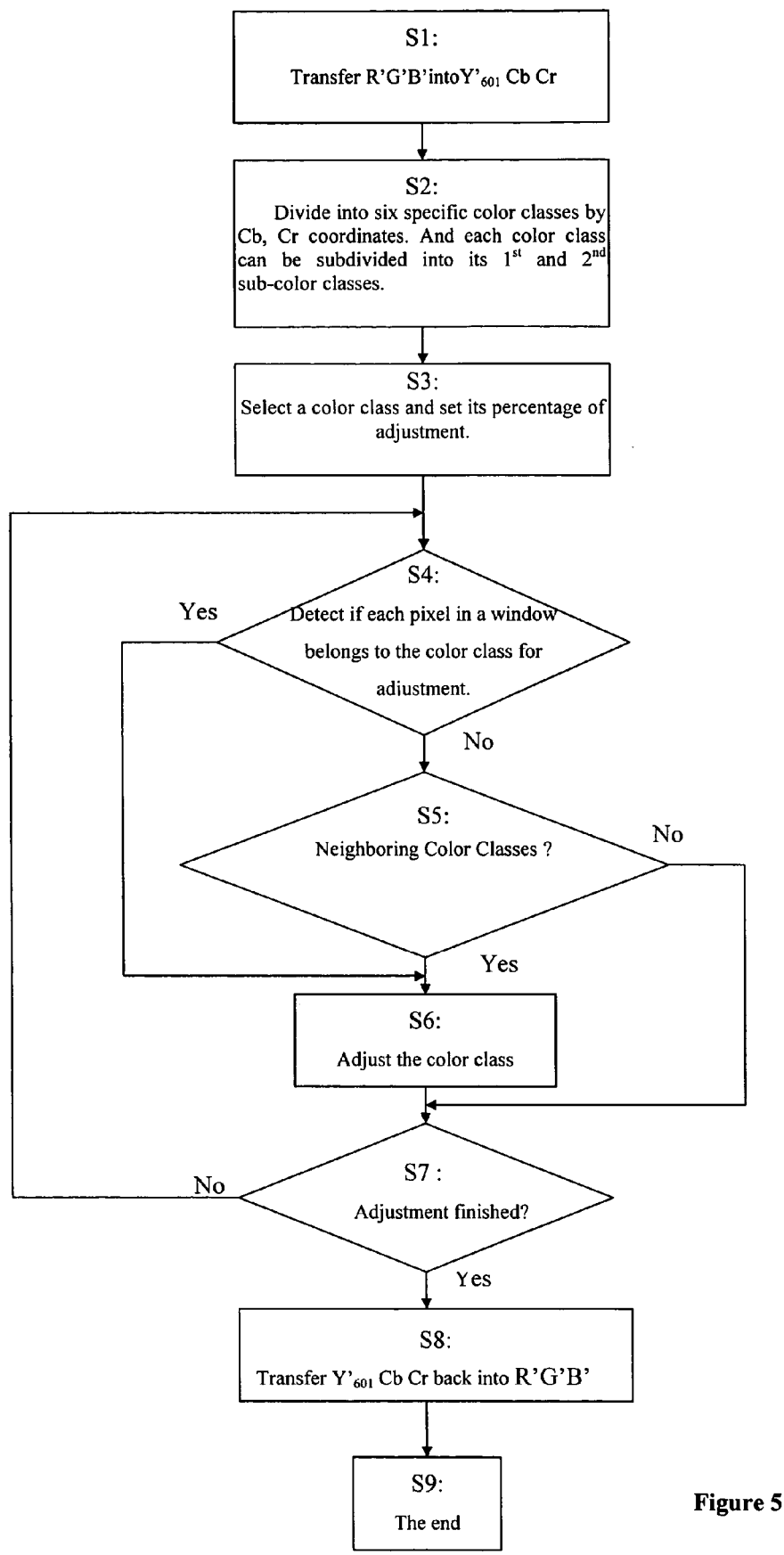
FIG. 5 shows a flow chart for independently adjusting a specific color class.

FIG. 5 is a preferred embodiment that shows a flow chart of independently adjusting a specific color class accordingly. It contains the following steps:

S1: By (1), first transfer R'G'B' into $Y'_{601}$,Cb,Cr.

S2: Divide into six specific color classes by Cb, Cr. And each specific color class can be subdivided into its $1^{st}$ and $2^{nd}$ sub-color classes.

S3: Select a specific color class (ex. Blue class) and set its percentage of adjustment, i.e. degree of variation.

S4: Detect if each pixel in a window belongs to blue class by the triangular function tangent and the value of Cb, Cr. If the value of Cb, Cr belongs to blue class, go to S6; if the value of Cb, Cr doesn't belong to blue class, go to S5.

S5: By the triangular function tangent and the value of Cb, Cr, detect if each pixel in a window is neighboring with blue class and if it belongs to some neighboring color class of blue class (MB or BC). If all the requirements above are met, go to S6; if not, go to S8.

S6: Adjust the blue class or its neighboring color class (MB or BC) by the percentage of adjustment set before, i.e. degree of variation.

S7: Check if each pixel in a window has been adjusted already. If so, go to S8; if not, go to S4.

S8: Transfer $Y'_{601}$,Cb,Cr back into R'G'B' for showing on the display device.

S9: Adjustment process is finished.

Of course, the flow chart in the FIG. 5 can also be used for other 5 specific color classes, in addition to the blue class. Practically, the adjustment process can be performed by a software operation interface. By this software operation interface, such as Graphical User Interface (GUI), the rate of adjusting every color class can be modified directly.

Generally speaking, this invention is to propose the method for independently adjusting a specific color class on a display device, which mainly is, by detecting multiple pixels of a display device, to obtain their Cb and Cr tints, and to adjust some first pixel's color when its two tints locate in the same color class. Besides, for some $2^{nd}$ pixel that is neighboring with the $1^{st}$ pixel, we adjust its color if its two tints locate in some other neighboring color class. And, except for the $1^{st}$ pixel and the $2^{nd}$ pixel, all the other pixels should remain their original colors.

Technically, in this invention, the display device is a TFT-LCD panel or a PDP. The display color may be divided into six independent color classes. Each color class can be subdivided into its own $1^{st}$ and $2^{nd}$ sub-color classes. The six independent color classes are red class, yellow class, green class, cyan class, blue class, and magenta class. Each of these six independent color classes takes the area around 42 degrees in the two-dimensions of Cb, Cr, respectively. And in a preferred embodiment of the invention, a $1^{st}$ and a $2^{nd}$ sub-color class respectively takes the area around 21 degrees in its own color class. In the six independent color classes, the red class is between 81 to 124 degrees; the yellow class is between 146 to 188 degrees; the green class between 220 to 262 degrees; the cyan class is between 262 to 304 degrees; the blue class is between 326 to 8 degrees; the magenta class is between 40 to 81 degrees. Multiple pixels of the display device are exactly those in some window of the display device. And multiple pixels of the display device are also all the pixels of the display device.

To sum up, in this invention of a specific color class adjustment, we should first consider if each individual pixel's color class is the one we'd like to adjust. If so, then we do independent adjustment on it. Further, for neighboring color classes of the adjusted ones, we can also adjust them. All the steps above will help to meet users' requirements.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for independently adjusting six color classes with the consideration of boundary colors on a display device comprises steps of:
   detecting a plurality of pixels of a display device and calculating a first tint and a second tint of said pixels;
   defining a first pixel, said first tint and second tint of said first pixel both locating in said color class;
   defining a second pixel, said second pixel being close to said first pixel, and said first tint and said second tint of said second pixel both locating in the neighboring of said color class;
   defining a third pixel, said third pixel presenting a pixel being neither said first pixel nor said second pixel;
   finding the first pixel and second pixel on said display device and adjusting their colors; and
   finding the third pixel on said display device and keeping its original color.

2. The method according to claim 1 wherein said display device is a LCD or PDP or OLED.

3. The method according to claim 1 wherein said first tint is Cb and said second tint is Cr.

4. The method according to claim 1 wherein said there are six independent color classes.

5. The method according to claim 4 wherein said six independent color classes are red class, yellow class, green class, cyan class, blue class, and magenta class.

6. The method according to claim 5 wherein said each of the six independent color classes takes the area around 42 degrees in the two dimensions of Cb, Cr, respectively, where the red class is between 81 to 124 degrees; the yellow class is between 146 to 188 degrees; the green class is between 220 to 262 degrees; the cyan class is between 262 to 304 degrees; the blue class is between 326 to 8 degrees; the magenta class is between 40 to 81 degrees.

7. The method according to claim 6 wherein each of the six independent color classes can be subdivided into two sub color classes taking the area around 21 degrees in the two dimensions of Cb, Cr, respectively.

8. The method according to claim 7 wherein said red class further has its own first sub-red (R1) class and second sub-red (R2) class; the yellow class further has its own first sub-yellow (Y1) class and second sub-yellow (Y2) class; the green class further has its own first sub-green (G1) class and second sub-green (G2) class; the cyan class further has its own first sub-cyan (C1) class and second sub-cyan (C2) class; the blue class further has its own first sub-blue (B1) class and second sub-blue (B2) class; the magenta class further has its own first sub-magenta (M1) class and second sub-magenta (M2) class. And, the sub-yellow-red (YR) is defined as between the first sub-yellow (Y1) and the second sub-red (R2); the sub-green-yellow (GY) is defined as between the first sub-green (G1) and the second sub-yellow (Y2); the sub-blue-cyan (BC) is defined as between the first sub-blue (B1) and the second sub-cyan (C2); the sub-magenta-blue (MB) is defined as between the first sub-magenta (M1) and the second sub-blue (B2).

9. The method according to claim 8 wherein said neighboring colors of the red class are the sub-yellow-red (YR) class and the second sub-magenta (M2) class; the neighboring colors of the yellow class are the sub-green-yellow (GY) class and the sub-yellow-red (YR) class; the neighboring colors of the green class are the first sub-cyan (C1) class and the sub-green-yellow (GY) class; the neighboring colors of the cyan class are the sub-blue-cyan (BC) class and the second sub-green (G2) class; the neighboring colors of the blue class are the sub-magenta-blue (MB) class and the sub-blue-cyan (BC) class; the neighboring colors of the magenta class are first sub-red (R1) class and the sub-magenta-blue (MB) class.

* * * * *